Sept. 25, 1962  E. M. HOGANSON  3,055,086
METHOD OF FASTENING
Filed Dec. 24, 1958

INVENTOR.
EUGENE M. HOGANSON
BY
William O. Hickey
ATTORNEY 3,055,086
METHOD OF FASTENING
Eugene M. Hoganson, St. Joseph, Mich., assignor to The Bendix Corporation, a corporation of Delaware
Filed Dec. 24, 1958, Ser. No. 782,866
3 Claims. (Cl. 29—157.1)

The present invention relates to a new and improved fastening method; and more particularly to a method for locking members within small diameter openings.

An object of the present invention is the provision of a new and improved fastening method which is more effective than snap rings for securing members in small diameter openings.

A further object of the present invention is the provision of a new and improved method for fastening members in openings which will produce a fluid tight joint.

A still further object of the invention is the provision of a new and improved method of fastening annular valve seat members in openings which will provide a fluid tight joint and at the same time not produce distortion of the valve seat.

Further objects and advantages of the invention will become apparent to those skilled in the art to which the invention relates from the following description of the preferred structure and method described with reference to the accompanying drawing forming a part of this specification, and in which.

One difficulty with the use of snap fasteners for securing structures in small openings, is that they become more rigid as their size decreases. This being true, small diameter snap fasteners will only project a few thousandths of an inch into their receiving grooves in their fully expanded condition.

Figure 1:
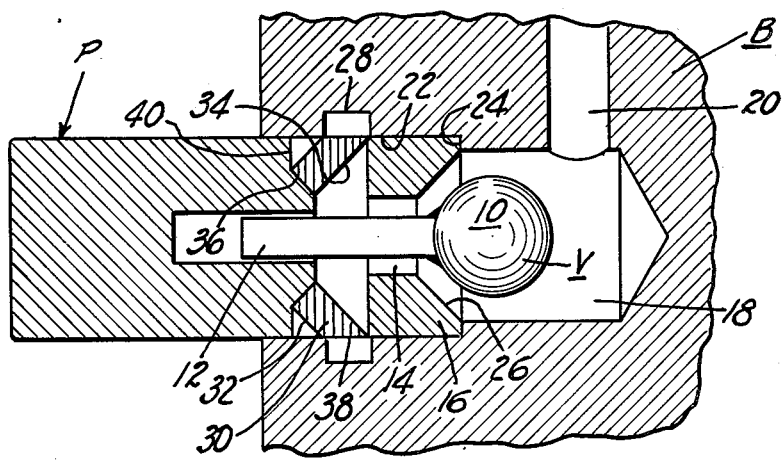
FIGURE 1 is a fragmentary cross section view of parts telescopically positioned during an initial stage of their assembly according to the principles of the present invention.
Figure 2:
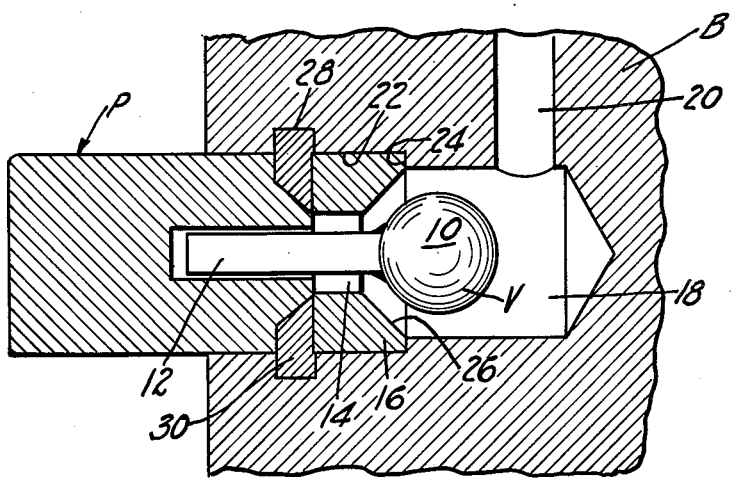
FIGURE 2 is a view similar to FIGURE 1 but showing the parts in their final positions.
Figure 3:
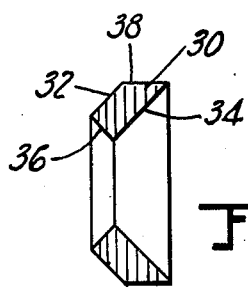
FIGURE 3 is a cross section view of a fastening member shown in FIGURE 1.

Referring to FIGURE 1 of the drawing there is seen therein a fragmentary portion of the power piston B of the device shown and described in applicant's application Serial No. 777,242 filed December 1, 1958, and now abandoned. The power piston is provided with a compensating valve V whose function it is to prevent flow from the high pressure discharge chamber to the lower pressure actuating side of the piston when the piston B is actuated (from the right to the left as seen in FIGURE 1), but which will be positively opened when the power piston returns to its normal deactivated condition. This is accomplished by means of a ball valve 10 to which there is resistance welded a stem 12 which projects out through a valve port 14 in a valve seat member 16. The stem projects beyond the left face of the piston to engage a suitable abutment when the piston nears its retracted position, and thereby positively open the valve to permit desired fluid compensation across the piston.

The passageway containing the ball valve structure is formed by means of a bore 18 which is drilled into the rear face of the piston to provide a chamber for receiving ball 10, and a smaller diameter bore 20 which communicates the inner end of this bore with the opposite side of the piston B. The outer end of the bore 18 is counterbored as at 22 to provide a shoulder 24, against which shoulder the valve seat member 16 is to be positioned. It has been found that the valve seat member 16 cannot be provided with a sufficient interference fit with respect to the counterbore to provide a fluid tight connection without at the same time producing a distortion of its valve seat 26 when the valve seat member is pressed into position. The diameter of the counterbore which has been used has been approximately 0.275 inch in diameter, and snap rings of this size when expanded into their receiving groove only project approximately 0.009 inch therein. Snap rings of this size have not proven commercially feasible. The valve seat member 16 is preferably provided with a slight clearance with respect to the walls of the counterbore 22 so that it slips into place easily and will not therefore be distorted.

The valve seat member 16 is retained in the counterbore 22 by means of a generally conically shaped retaining member 30 which is expanded into the recess 28 by means of an axially driven punch P.

The retaining member 30 is an automatic screw machine part although it can be formed by a suitable stamping operation. The preferred embodiment is provided with generally parallel conically shaped inner and outer surfaces 32 and 34 respectively, that are formed at an angle of approximately 45° to the central axis of the part. The retaining member shown is provided with a central opening 36 whose walls are generally perpendicular to the inner and outer conical surfaces, and in the embodiment shown in the drawing form an angle of approximately 50°. The outside edge of the retaining member is generally parallel to the sidewalls of the counterbore, and the thickness of the retaining member shown in the drawing is approximately 0.050 inch. In the embodiment shown in the drawing the recess 28 is made between 0.055 and 0.060 inch wide and the outer edge of the valve seat member 16 projects outwardly of its inner edge by from 0.005 to 0.010 inch so that it substantially fills the recess by reason of its thickness when the retaining member is rotated into position. Since the sides of the retaining member are tapered, the initial movement into the groove causes a wedging action between the outer edges of the recess 28 and retaining member 30 which firmly forces the valve seat member 16 against the shoulder 24. Inward movement of the punch P deforms the retaining member P causing it to flatten out thereby producing a rotation and radially outwardly expansion of its outer edge into the recess 28. This radially outwardly expansion defors its outer edge 38 against the bottom of recess 28 and against the outer edge of the valve seat member 16 to provide a fluid tight seal. The deformed retaining member substantially fills recess 28 and the punch P is provided with an outer generally flat annular portion 40 which firmly deforms the retaining member 30 against the valve seat member 16.

It will be apparent that the objects heretofore enumerated as well as others have been accomplished; and that there has been provided a structure and fastening method which will provide a fluid tight joint and adequately serve to retain members within small bores.

While the invention has been described in considerable detail, I do not wish to be limited to the particular structure and methods shown and described, and it is my intention to cover hereby all novel adaptations, modifications and arrangements thereof which come within the practice of those skilled in the art to which the invention relates.

I claim:

1. A fastening method comprising: providing a body member having a bore therein, said bore being counterbored at the outer end of said bore, the junction of the counterbore and bore forming a shoulder, said counterbore having an annular recess in the wall thereof spaced outwardly from the shoulder; inserting a first member into the counterbore with the inner end surface of said first member engaging said shoulder, the outer side surface of said first member being contiguous the counterbore wall, and the outer end surface of said first member being closely adjacent the edge of said annular recess nearest to said shoulder, said first member being of an axial thickness equal to at least the distance between said shoulder and said last mentioned edge; providing a deformable second member having a generally conically shaped inner surface tapered outwardly from the outer axial end of the second member toward the inner axial end thereof, a conical first outer surface substantially parallel to said conical inner surface, a second outer surface at the inner axial end of said second member forming an acute angle and obtuse angle with the conical inner surface and the conical first outer surface, respectively, and substantially parallel to the axis of said second member, said second outer surface having a diameter approximately equal to that of the counterbore; disposing said second member in said counterbore with the junction between the conical inner surface and the second outer surface being brought into engagement with the outer end surface of said first member, and said second outer surface being contiguous of said annular recess; producing pressure upon the outer axial end of said second member which will press the second member against said first member and bend and expand said outer surfaces of the second annular member into said recess and concurrently reshape the second outer surface of said second member conforming it with said annular recess and firmly engage the inner surface of said second member with the outer end surface of said first member.

2. A method for mounting a valve having a seatable valve member, comprising the steps of: providing a body member having a bore therein, said bore being counterbored at the outer end of said bore, the junction of the counterbore and bore forming a shoulder, said counterbore having an annular recess in the wall thereof spaced outwardly from the shoulder; providing a first annular member having an axial thickness equal to at least the distance between said shoulder and the edge of said annular recess nearest to said shoulder, and having an outer diameter approximately equal to that of the counterbore; providing a deformable second annular member having a generally conically shaped inner surface tapered outwardly from the outer axial end of the second member toward the inner axial end thereof, a conical first outer surface substantially parallel to said conical inner surface, a second outer surface at the inner axial end of said second member forming an acute angle and obtuse angle with the conical inner surface and the conical first outer surface, respectively, and being substantially parallel to the axis of said second member, said second outer surface having a diameter approximately equal to that of the counterbore; disposing said seatable valve member into said bore and said first annular member and said second annular member into said counterbore, said first annular member being positioned with the inner end surface of said first member engaging said shoulder, the outer side surface of said first member being contiguous the counterbore wall, and the outer end surface of said first member being closely adjacent said edge of said annular recess, said second annular member being positioned with the junction between the conical inner surface and the second outer surface of said second annular member being in engagement with the outer end surface of said first annular member, and said second outer surface of said second annular member being contiguous of said annular recess; producing pressure upon the outer axial end of said second annular member which will press the second annular member against said first annular member and bend and expand said outer surfaces of said second annular member into said recess and concurrently reshape the second outer surface of said second member conforming it with said annular recess and firmly engage the inner surface of said second member with the outer end surface of said first member.

3. A method for mounting a ball valve having an elongated stem extending from said ball, comprising the steps of: providing a body member having a bore therein, said bore being counterbored at the outer end of said bore, the junction of the counterbore and bore forming a shoulder, said counterbore having an annular recess in the wall thereof spaced outwardly from the shoulder; providing a first annular member having an axial thickness equal to at least the distance between said shoulder and the edge of said annular recess nearest to said shoulder, and having an outer diameter approximately equal to that of the counterbore; providing a deformable second annular member having a generally conically shaped inner surface tapered outwardly from the outer axial end of the second member toward the inner axial end thereof, a conical first outer surface substantially parallel to said conical inner surface, a second outer surface at the inner axial end of said second member forming an acute angle and obtuse angle with the conical inner surface and the conical first outer surface, respectively, and being substantially parallel to the axis of said second member, said second outer surface having a diameter approximately equal to that of the counterbore, disposing the ball portion of said valve into the bore, by inserting the stem into said counterbore, and said first annular member and said second annular member into said counterbore, said first annular member being positioned about said stem and having its inner end surface engaging the shoulder and the outer end surface of said first member being closely adjacent said edge of said annular recess and the outer side surface of said first annular member being contiguous the counterbore wall, said second annular member being positioned with its opening about the stem and having the junction between the conical inner surface and the second outer surface in engagement with the outer end surface of the first annular member, said second outer surface being contiguous of said annular recess; producing pressure upon the outer axial end of said second annual member which will press the second annular member against said first annular member and bend and expand said outer surfaces of the second annular member into said recess and concurrently reshape the second outer surface of said second annular member conforming it with said annular recess and firmly engage the inner surface of said second member with the outer end surface of said first member.

References Cited in the file of this patent
UNITED STATES PATENTS

| 417,446 | Sands | Dec. 17, 1889 |
| 793,307 | Lachman | June 27, 1905 |
| 2,468,646 | Verhoff | Apr. 26, 1949 |
| 2,536,958 | Rudat et al. | Jan. 2, 1951 |
| 2,752,693 | Wullschleger | July 3, 1956 |
| 2,757,945 | Bingham | Aug. 7, 1956 |
| 2,762,538 | Nyden | Sept. 11, 1956 |

FOREIGN PATENTS

| 120,409 | Australia | Oct. 11, 1945 |